Figure 1:
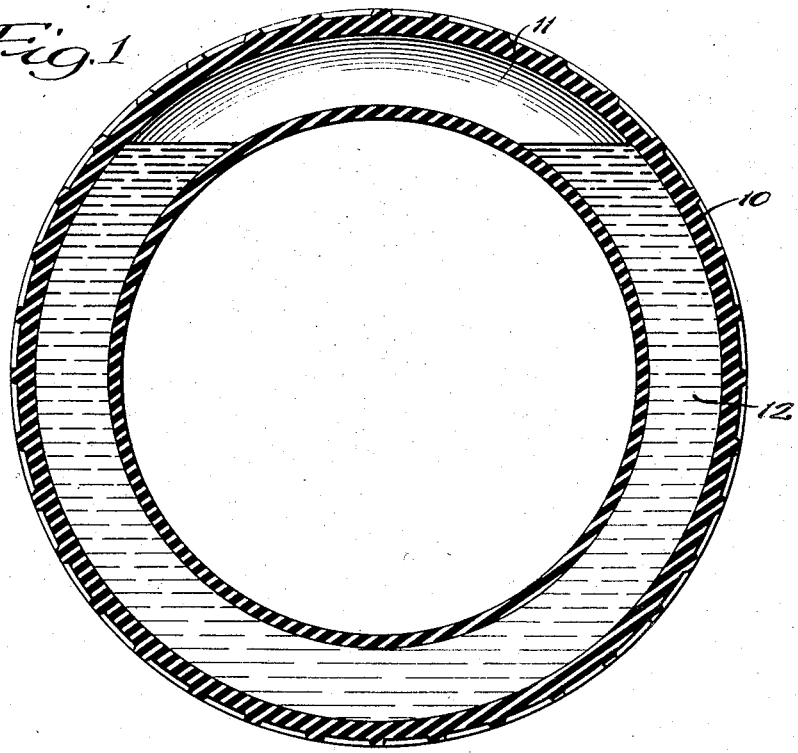

April 28, 1959 W. L. HICKS 2,884,039
VEHICLE TIRE BALLAST
Filed Sept. 28, 1955 2 Sheets-Sheet 1

INVENTOR:
William L. Hicks,
Dawson, Tilton & Graham,
ATTORNEYS.

April 28, 1959 — W. L. HICKS — 2,884,039
VEHICLE TIRE BALLAST
Filed Sept. 28, 1955 — 2 Sheets-Sheet 2

INVENTOR:
William L. Hicks,
BY Dawson, Tilton, Fallon & Lungmus,
ATTORNEYS.

2,884,039

VEHICLE TIRE BALLAST

William L. Hicks, Boulder, Colo.

Application September 28, 1955, Serial No. 537,259

4 Claims. (Cl. 152—330)

This invention relates to vehicle tire ballast, and to the combination of such ballast with tires. The invention is particularly useful as a composition of matter for application in the tires of a moving vehicle to provide added weight for better traction without obtaining undesirable movements, vibrations and other actions as the machine moves in forward motion.

A problem in any prime mover which is required to pull heavy loads, such as a farm tractor, has been to obtain sufficient weight upon the traction wheels to provide adequate drawbar pulling power. It is commonly known that the coefficient of friction between rubber tires and the surface over which they travel, such as an unplowed field, is about 0.5. This means that for every pound of weight on each rear wheel of a tractor, the tractor will exert a pull of not to exceed 0.5 pounds in a horizontal direction. On hard surfaces, such as rough concrete, the coefficient of friction will reach as high as 0.6, while on sandy ground the coefficient of friction may drop as low as 0.25 to 0.3. Pulling power may be thus reduced very seriously in such latter operations. Where traction is very poor, with wheel type tractors, the crawler track type tractor has become popular, since its coefficient of friction is about 1.0 on many surfaces and for a given weight tractor, much heavier loads can be pulled.

To obtain added weight on the rear wheels of a farm or industrial tractor, it has been common practice to add cast iron weights to the rear wheels, or, alternatively, to pump liquid into the tires. Calcium chloride and similar salts have been added to water and the mixture has been pumped into the tires to increase the weight of the tires, the salts serving to increase the specific gravity of the solution used and also to prevent freezing of the liquid. However, it has been found that the use of such liquid mixtures or solutions, when introduced into the tires, bring about undesirable movements and vibrations, sometimes called "loping," in the wheel operation. The low viscosity liquid moves back and forth easily in the tire while in operation, producing surging movements which bring about an unbalanced dragging or loping movement. These undesirable side actions reduce the power and smooth operation of the tractor.

When mounting tires in which liquid ballast is to be used, it has been the common practice to use an inner tube within the casing to hold the air as well as the liquid ballast. I have discovered that a tire manufactured to hold air without a tube is more convenient for application of the ballast of this invention. I have discovered that the powder ballast of this invention may be easily blown or conveyed into the mounted tubeless tire casing through the valve stem hole in the rim. Furthermore if desirable, a second hole may be inserted in the tire rim through which the powder ballast of this invention may be blown or conveyed.

I have discovered that the undesirable unbalanced action of the liquid weighted tire can be overcome through the use of powders which absorb air upon agitation as in the turning of a tire which contains the powder. Any powder may be used which has been so ground and pulverized that upon agitation or turning within the tire, it will absorb air and become in part air borne. As a result of this air entrainment within the powder ballast, the tire may become in effect completely filled with air borne powder, and in this way become a balanced tire. As a result of this air absorption of the powder ballast within the tire, and the apparent balance of the tire, the jerkiness or loping action of the tractor is eliminated and there is a smooth flow of powder in the operation of the tractor.

An object of this invention is to provide a tractor tire or vehicle tire partially filled with a powder ballast which eliminates the jerky or loping action heretofore obtained with liquid filled tires. A further object is to provide a composition of matter within the tire of a vehicle for providing added weight thereto while eliminating undesirable side movements, vibrations, etc. A still further object is to provide in a tire a relatively high specific gravity powder supplying weight to the tire while leaving an air chamber or air cushion in the tire as a pneumatic compressible medium.

Another object of this invention is to provide a ballast in powder form which will, when agitated, absorb a minimum of 3% to 30% of air to become partially air floated and compressible and which will serve as a pneumatic body within the tire.

In operation, the tire casing may be filled to 80% to 97% of its capacity with the powder ballast. The remaining void within the tire is then filled with air to the desired air pressure.

In high speed operation of a tractor or other rubber tired vehicle the tires of which contain a solution such as calcium chloride in water, filled to 90% of the capacity of the tire, the liquid, if it could be observed through the walls of the tire, would tend to remain below the air space in the top of the tire. While turning, the liquid, being of low viscosity and free flowing, tends to flow within the wheel, leaving a void at the top of the wheel. This continual flowing gives the rocking or jerking action, producing the unbalance and vibrations which have been referred to above. By providing a powder ballast which upon agitation absorbs air causing the powder to assume a greater volume, a ballast is obtained which completely fills the void within a tire when moving, thus producing a balanced tire. This prevents the rocking, loping action noted with liquid ballasts which only partially fill the tire.

The problem of unbalance of a partially filled tire with liquid ballasts has been eliminated in use by filling to 100% of the capacity of the tire with liquid. While this eliminates the jerky, loping action which is so objectionable, the liquid medium is uncompressible and as such in a tire, eliminates the soft riding qualities of a pneumatic tire. With the 100% liquid filled tire, bruises of the tire casing are common in that the tire is less compressible. When the tire is filled with the compressible air borne powder of this invention, even though it is filled to an apparent 100% of its capacity, the tire retains its pneumatic riding and flexing characteristics because of the air retaining properties of the powder.

Another object of this invention is to provide a tire containing a compressible high specific gravity powder which will provide pneumatic compressibility under heavy loads. A 50 gal. capacity tire when filled to 90% of its capacity with liquid ballast, leaves only 5 gal. of its capacity to be filled with air. Reed, Reaves, and Shields working with the U.S. Department of Agriculture published tests showing that a completely air filled tire changed very little in pressure under operating pulling loads. In contrast, a 80 to 100% liquid filled tire changes as much as 25% in operating pressure when under pulling loads. It is believed that under a pulling load, the tire actually tends to reduce in size if it contains a sufficient volume of a compressible medium such as a 100% air-filled tire. A tire having a capacity of fifty gallons, when filled to 90% with the powder ballast of this invention, has as much as twenty-six gallons of air entrapped between the particles of powder. This air being compressible, provides a cushioning effect, which in field use reflects itself in pulling power, and increased traction, because the tire can flatten out when under a pulling load. Farmers, and heavy equipment operators have known for a long time, that tires filled with liquid ballast did not have the traction, which the increased weight of the ballast should provide. I have found however, that it is the flattening pneumatic effect of a tire, under heavy drawbar pull, which is desired, and which can be obtained with powdered air-borne ballast, but which is not possible with liquid ballasts.

It may be easily demonstrated that any organic or inorganic solid may be pulverized to 100 mesh size, or finer, and that this powder upon agitation absorbs air. In practical operation of a tire with this ballast in dry form, the tire is filled to 90% of its volume with the dry settled powder, and 10% of its volume with air at the desired pressure. Upon turning of the tire, the 10% of air becomes intimately entrained within the powder to provide a pneumatic, compressible effect to the ballast air mixture. This gives better riding qualities to the tractor or other motor vehicle, as well as reducing danger from damage when the tire strikes objects, such as a stone or other obstruction. Whatever be the condition within the tire, it is true that the pulverized solid material, which absorbs air, eliminates the undesirable vibrations and jerky action, which has heretofore attended the use of liquid filled tires containing the liquid mixtures.

More specifically, I have discovered that barium sulfate, commonly referred to as barites, when ground to 100 mesh, or finer, is highly effective in a powder form as a ballast in tires by reason of its high specific gravity and air absorbing qualities in the pulverized condition. Commercial barites consists of at least 80% barium sulfate as a natural mineral. When ground to a powder of which 90% passes 100 mesh, it has been found highly effective as a ballast in tractor and road equipment tires.

Further I have found that other high bulking powders, such as iron oxide, lead carbonate, lead oxide, clays, calcium carbonate, silicates and many organic powders may be employed as a ballast medium, by a similar pulverizing treatment.

This invention may be illustrated by the following specific examples, in which the parts are set out by weight.

*Example 1*

A tractor tire casing was mounted as a tubeless tire, and filled to 90% of its capacity with 300 mesh commercial barites. The tire filled to this capacity was unbalanced in a static condition. However upon turning for several complete revolutions, it was observed that the tire was completely balanced and operated with a minimum of power required for turning, which is characteristic of a balanced tire.

*Example 2*

Commercial barite containing 87% barium sulfate was ground to a uniform particle size passing a 15 mesh screen and retained on a 25 mesh screen. This material was pumped into a 12:28 tubeless tractor tire. 900 lbs. of material were added to each tire, filling it to 90% of its capacity. The tire was inflated to 15 lbs. of air pressure. When operated at speeds up to 5 miles per hour on a tractor, it was obvious that the material remained in the bottom of the tire and that the air space remained at the top. This gave an unbalanced tire, which did not roll easily and required added power for operation. When operated at 15 miles per hour the tire was very unbalanced and loped or jumped very noticeably.

The barite was removed from the tire, and the same weight of pulverized barite added, to the tire. This barite had been pulverized to a fine powder, 97% of which passed 100 mesh. It was observed that the finely pulverized barite retained any entrained air much better than the coarsely ground material. The tire containing the finely pulverized barite was inflated to 15 lbs. pressure. In operation at speeds up to 5 miles per hour, a very noticeable difference was observed over the 15 mesh barite. After as little as 2 revolutions of the tire, it rolled as though balanced. Little drag was noted. No loping or unbalanced jumping was noted at speeds of 15 miles per hour. The tire acted like an air filled tire. Much easier riding was noted over the tire filled with the 15 mesh barite, or previously tested liquid calcium chloride ballast. When the tire hit a raised object, it flexed and gave much like an air filled tire, and very much in contrast to the rigid action of the tire filled either with liquid ballast or the coarsely pulverized barite, in the above example. The 100 mesh powdered barite apparently was compressible, after limited agitation with air, and even though very heavy, provided a pneumatic tire.

When the tires filled, as above, were observed pulling under heavy load, the tire containing the coarsely ground barite flattened very little at the bottom, where it contacted the ground. In contrast, the tire containing the finely pulverized barite, and inflated to the same air pressure, flexed more and flattened very noticeably at the bottom when under heavy pulling load. The flattening or squatting action of the tire was similar to that observed with air filled tires under heavy pulling load. It has been believed for many years, by operators, that liquid filled tires on farm tractors and heavy road equipment did not provide the traction, which their increased weight should provide. I have found this to be true, because they did not flatten out, under heavy loads.

*Example 3*

110 lbs. of silica sand analyzing 90% between 10 and 20 mesh was put into a 6:00–16 automobile tire. A second tire of similar size was filled with silica sand, which had been pulverized to 98% passing 100 mesh and 95% passing 250 mesh. Each tubeless tire was inflated to 30 lbs. air pressure and mounted on a light truck. A decided difference was noted in operation. The tire containing the pulverized sand operated like a completely air filled tire, flexing and giving under impact. The tire containing the coarse sand operated more like a solid tire, and gave very little at the bottom when under impact, and at low speeds. The tire containing the coarse sand could not be operated over 5 miles per hour in as much as the tire was unbalanced. The tire with the pulverized sand was operated at speeds up to 60 miles per hour without difficulty. This proved the pneumatic qualities of the pulverizing process on increasing the air absorbing qualities of the silica sand, used in this example.

*Example 4*

Commercial bentonite of 15 mesh size was tested in the laboratory for air holding qualities. When agitated with air in a 500 cc. graduated cylinder, a limited amount of air was absorbed by the granular 15 mesh material. Upon stopping agitation, all entrained air separated immediately from the granular bentonite. The same grade of bentonite was pulverized to 200 mesh. When agitated in a 500 cc. graduated cylinder the pulverized material absorbed several times as much air as the granular material, and when agitation was stopped, the entrained air was retained for 10 to 30 minutes within the powder.

Pulverized bentonite analyzing 97% passing 200 mesh, was blown into a 12:28 tubeless tractor tire. It was observed that the tire containing the pulverized bentonite operated and flexed much as an air filled tire. Under heavy pulling loads, the filled tire squatted or flattened at the bottom, or traction surface, much like an air filled tire.

Example 5

Two 11:28 tractor tires were filled to 90% of their capacity with a liquid suspension of barite in a dilute solution of carboxy methyl cellulose, as described in U.S. Patent application Serial No. 463,853, now Patent No. 2,797,721, July 2, 1957. This suspension as pumped into the tires weighed 18.5# per gal. and 850 lbs. were pumped into each tire. The tires were then inflated to 14 lbs. air pressure, and it was calculated that each tire contained 5.1 gal. of air and 45.9 gal. of noncompressible liquid. In use on a tractor, it was observed that these tires did not change contour appreciably, when under heavy load. Previously a similar set of tires filled with air to 14 lbs. pressure had been observed, and it was noted that when pulling a heavy load, they flattened somewhat more on the bottom, when under pulling load. This flattening action is very desirable in that it gives the tire more surface contact with the ground and greater traction under load. On large tires, on heavy earth moving equipment, this flattening action is very important in terms of traction and pulling power.

In contrast to the above tires filled with a liquid ballast, two similar size tires were filled with powder ballast, of this invention. 850 lbs. of 200 mesh pulverized barite were added to each tire. This provided an apparent 90% fill of each tire. The true specific gravity of the powdered barite was found to be 4.1. As such, it was calculated that the tire contained only 25.4 gallons of the solid powdered mineral, which would be non-compressible, and 25.6 gallons of compressible air, which was intermixed between the particles of barite. This is 5 times the amount of air as in the tire filled with the liquid suspension of barite, as above. When inflated to 14 lbs. of pressure and put in operation on a farm tractor, it was observed that the tire squatted or flattened out much like an air filled tire when under heavy pulling load. This squatting effect provides greater traction, due to the greater surface area in contact with the ground. This squatting effect also increases pulling power, in that the flatter tire has a smaller radius, which in turn gives greater lbs. of pull when under heavy load, with the same engine torque.

A farm tractor designed to transfer the weight of a plow to the rear or driving wheels of the tractor, was tested with a 90% fill of calcium chloride as against a similar fill of a blend of pulverized limestone and barite. Under a heavy pulling load, it was noted that the tires changed their contour very little, when filled with the liquid ballast. However, when filled with the pulverized dry powdered ballast, the tire flattened very noticeably, as the tractor pulled a heavy load and transferred the plow weight to the rear wheels of the tractor.

Example 6

Two tractors were tested for rolling qualities. The first tractor having two 12:28 tires filled with air had 1000 lbs. of cast iron added to the tractor axle. The second tractor was weighted with liquid calcium chloride pumped into the tires. 1000 lbs. of weight was added to this second tractor with the liquid ballast. When allowed to roll freely down a hill, the tractor with the air filled tires rolled further which showed the dragging action of the liquid ballast.

A third tractor was observed to which 1800 lbs. of powdered ballast had been added to provide a 90% fill of each tire. This tractor when allowed to remain idle for 30 minutes or more showed a definite resistance to free rolling indicating that the powder had settled to some degree to the bottom of the tire making an unbalanced tire. However when this same tractor with the tires containing powder ballast was operated for a short distance the powder became air borne and it was observed that the tractor rolled much like the tractor with the air filled tires.

Any resilient vehicle tire may be employed, and the annular sealed chamber provided by the tire may be filled to varying extents with the pulverized ballast. For example the tire may be filled to 90% of its capacity with a pigment having a settled density of 1.0. If greater weights are desired in the same capacity tire, a pulverized mineral may be chosen of higher specific gravity.

The invention is illustrated by the accompanying drawing, in which—

Figure 2:
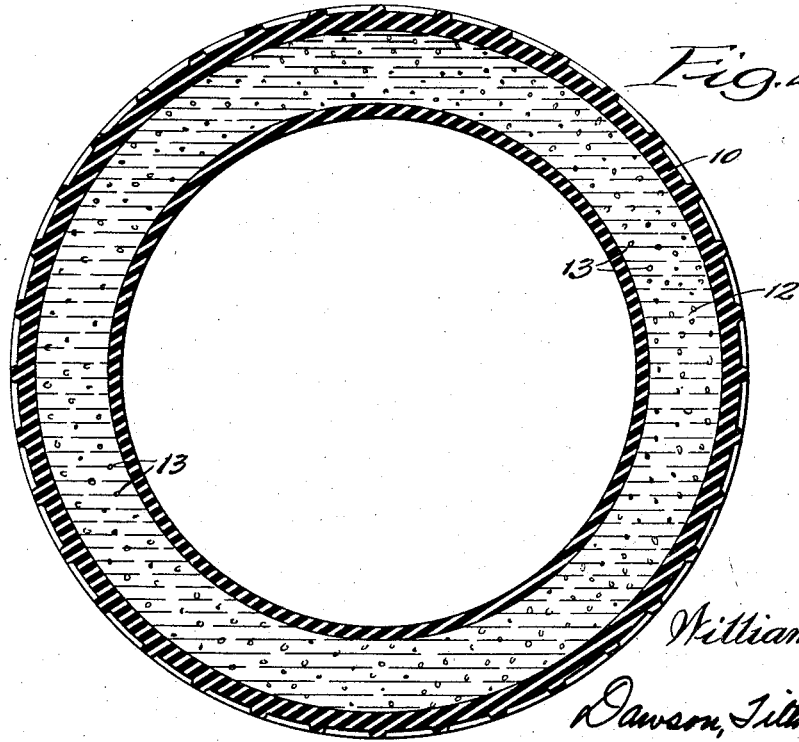
Figure 3:
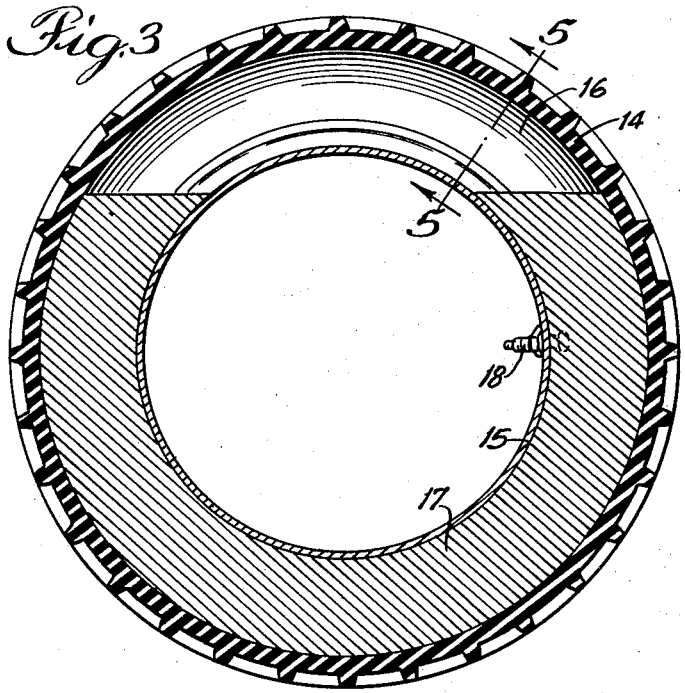
Figure 5:
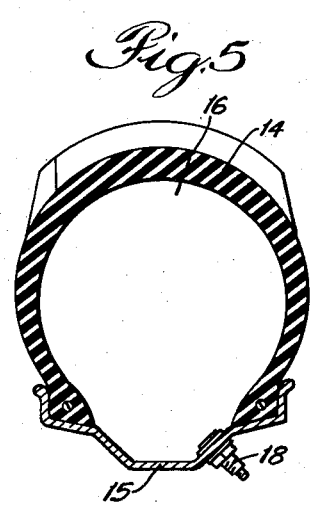
Figure 4:
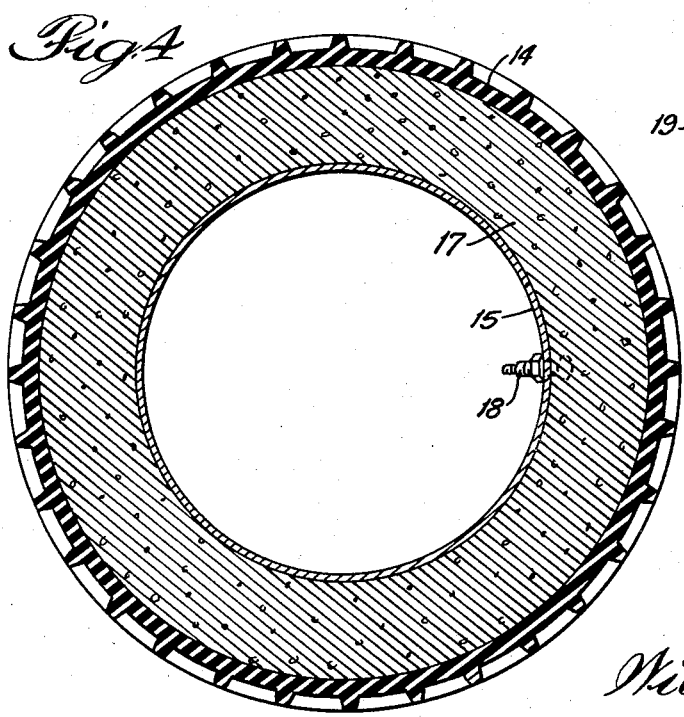

Figure 1 is a side view of a tire partly filled with powder ballast, a portion of the tire being shown in section;

Figure 2, a view similar to Figure 1 but showing the tire as it would appear after turning several times to agitate the powder and causing it to become air borne;

Figure 3, a vertical sectional view of a tractor tire in postion on a wheel rim and showing the ballast partially filling the tire; Figure 4, a view similar to Figure 3 but showing the tire after rotation in which the ballast is agitated so as to substantially fill the tire; Figure 5, a sectional view, the section being taken as indicated at line 5—5 of Figure 3; and Figure 6, a view similar to Figure 5 but showing a tube-equipped tire.

In the illustration given, 10 designates a tire providing an annular chamber having at the upper portion thereof an air space 11 and therebelow a powdered ballast 12. When the dry ballast is of a coarse granular composition, the material tends to remain, with some rolling resistance, generally in the position of Figure 1. Figure 2 shows the tire in a balanced condition as a result of the use of a highly pulverized ballast in the range of 95% passing 100 mesh, which upon agitation or turning of the tire caused the 10% of air contained therein to be entrained within the powder providing what appears to be a 100% filled tire. Thus the rolling or pitching effect is avoided and a balanced tire operation is achieved with a pneumatic compressible air borne power.

In the illustration given in Figs. 3, 4 and 5, a tubeless tractor tire 14 provides with a rim 15 an annular chamber having at the upper portion thereof an air space or void 16 and therebelow a ballast 17 containing fine powder particles having a fineness of 100 mesh or finer and of such quantity that during the rotation of the tire the ballast is entrained in the enclosed gas substantially filling the volume of the tire, as indicated in Fig. 4. The rim 15 is provided with an air valve 18 which is preferably large enough to permit the introduction of the ballast therethrough or, as stated herein on page 3, if desired, a second hole may be provided through which the powder ballast may be introduced, and such hole closed by a suitable valve.

Figure 6:
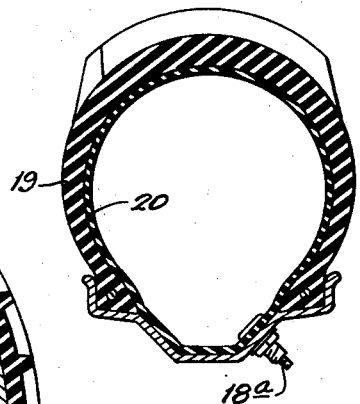

In the modification shown in Fig. 6, the tire 19 is provided with an innertube 20 and the same is equipped with a valve 18a.

While in the foregoing specification I have set forth specific compositions and steps in considerable detail for the purpose of illustrating embodiments of the invention, it will be understood that such details of composition and procedure may be varied widely by those skilled in the art without departing from the spirit of my invention.

I claim:

1. A ballasted vehicle tire, comprising a resilient vehicle tire having an annular sealed chamber inflatable with gas under pressure, a powder ballast partially filling said chamber to approximately 80% to 97% of its capacity when the tire is at rest, and leaving a void of from 3% to 20% at the top of the tire, a gas maintained within said chamber under pressure to inflate said tire and to provide a pneumatic tire capable of flattening out under heavy-pulling load, said ballast containing fine powder particles having a fineness of 100 mesh or finer and of such quantity that during rotation of the tire the ballast is entrained in the enclosed gas, substantially filling the volume of the tire with a densified, compressible, pneumatic medium for the tire.

2. The structure of claim 1, in which the ballast fills the entire chamber to about 90% of its capacity.

3. The structure of claim 1, in which substantially all of the ballast has a fineness of substantially 100 mesh or finer.

4. A ballasted vehicle tire, comprising a resilient vehicle tire providing an annular closed chamber inflatable with gas under pressure, a particle ballast comprising free-flowing small particles capable of absorbing about 3–30% of air under agitation and filling the greater portion of said chamber when said tire is at rest, said ballast leaving a void in the remaining upper portion of the chamber whereby the upper portion of said tire is unsupported by said ballast, and air under pressure filling said void and inflating said tire to provide a pneumatic, compressible tire capable of flattening out under heavy pulling load, said ballast containing a powder having a fineness of 100 mesh or finer and of such quantity that during the normal rotation of said tire the ballast is entrained in the gas, substantially filling the volume of the tire and preventing objectionable rocking or loping action of the tire during rotation.

References Cited in the file of this patent

UNITED STATES PATENTS

| | | |
|---|---|---|
| 2,038,653 | Gilbert | Apr. 28, 1936 |
| 2,109,383 | Gallardo | Feb. 22, 1938 |